United States Patent [19]

Naohara et al.

[11] Patent Number: 4,589,845
[45] Date of Patent: May 20, 1986

[54] APPARATUS FOR THE PREPARATION OF A FOAMED ARTICLE OF A POLYOLEFIN RESIN

[75] Inventors: Junsuke Naohara, Hiratsuka; Toshiki Horie, Yokohama; Toru Kino, Hiratsuka, all of Japan

[73] Assignee: Japan Styrene Paper Corp., Tokyo, Japan

[21] Appl. No.: 694,248

[22] Filed: Jan. 24, 1985

[30] Foreign Application Priority Data

Jan. 26, 1984 [JP] Japan ................................. 59-12739

[51] Int. Cl.$^4$ ..................... F27D 3/00; B65G 15/60; F27B 9/22
[52] U.S. Cl. ................................. 432/239; 198/841; 264/321; 432/140
[58] Field of Search ................. 432/8, 11, 140, 239; 264/321; 198/842, 848, 849, 841

[56] References Cited

U.S. PATENT DOCUMENTS

| 1,438,825 | 12/1922 | Harding | 198/842 |
| 1,922,908 | 8/1933 | Coleman | 198/849 |
| 3,161,155 | 12/1964 | Orlandi | 198/848 |
| 3,358,811 | 12/1967 | Gerrish | 198/831 |
| 3,820,650 | 6/1974 | Garvey | 198/842 |
| 4,173,814 | 11/1979 | Enicks | 264/321 |
| 4,338,078 | 7/1982 | Lampkin | 198/849 |

Primary Examiner—John J. Camby
Attorney, Agent, or Firm—Stephen F. K. Yee

[57] ABSTRACT

A sheet of a cross-linkable and foamable polyolefin resin is thermally treated on an endless conveyor belt formed of a plain weave wire net. A plurality of parallel, spaced apart rolls are disposed in a direction perpendicular to the direction in which the conveyor belt runs for supporting engagement and rolling contact with the conveyor belt to maintain the flatness of the conveyor belt.

5 Claims, 15 Drawing Figures

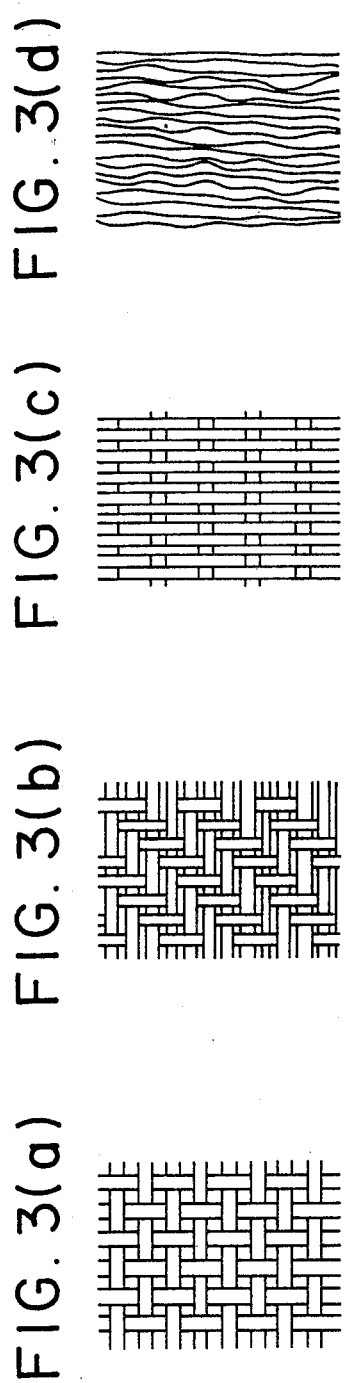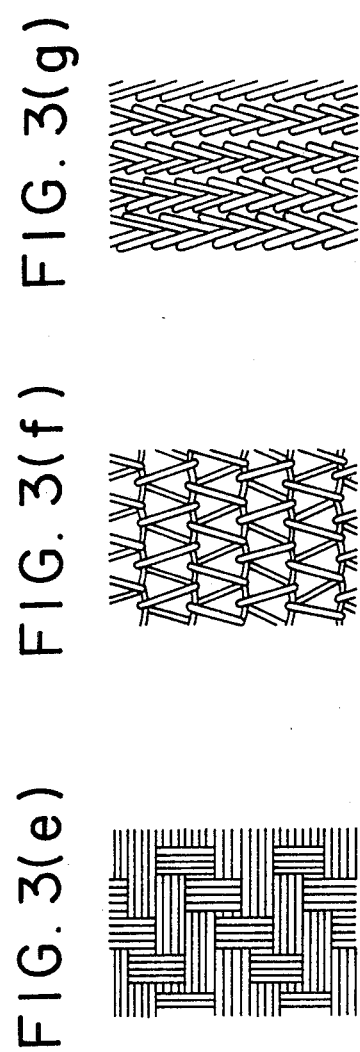

APPARATUS FOR THE PREPARATION OF A FOAMED ARTICLE OF A POLYOLEFIN RESIN

This invention relates generally to an apparatus and a method for the preparation of a foamed article of a polyolefin resin. More particularly, the present invention is concerned with an apparatus and a method for thermally treating a sheet of a cross-linkable and foamable polyolefin resin to effect cross-linking thereof.

Foamed articles of a polyolefin resin are generally prepared by a method including the steps of: providing a mixture containing a polyolefin, a cross-linking agent such as an organic peroxide and a blowing agent; forming the mixture into a desired shape such as into a sheet; placing the sheet on a flat support member such as a belt conveyor; heat treating the sheet provided on the support member at a first temperature by, for example, contact with a hot gas, to effect cross-linking and then at a second temperature to decompose the blowing agent and to allow the sheet to foam and expand. As the support member, both gas permeable and impermeable materials have been generally used. Although a gas-impermeable plate such as a metal plate has an excellent flatness, there is a considerable difference in temperature between the backside of the sheet in contact with the metal plate and the front side directly exposed to the hot gas. As a consequence, there is a difference between the backside and the front side in rates at which the cross-linking and the succeeding foaming proceed, resulting in the lack of uniformity of cell structures. In contrast, with a gas permeable belt such as a wire net, the sheet placed thereon can be heated substantially evenly from both sides of the sheet so that the sheet can cross-link and foam uniformly.

However, the use of an endless belt formed of a wire net has now been found to encounter the following problems:
1. Removal of the cross-linked sheet from the wire net involves a difficulty because of the intrusion of the sheet into the openings of the net during the heat treatment.
2. The mark or impression of the wire net pattern is formed on the surface of the cross-linked sheet, the mark becoming more obvious after foaming.
3. The joint portion of the endless belt causes unevenness of heating.
4. The wire net belt tends to slack during use, causing deformation of the sheet.

With regard to the problem 4 above, the loosening of the belt may be prevented by lining it with a reinforcement such as a rigid wire net having a coarse mesh and formed of thick wires. However, such a reinforcement decreases the area of the openings of the belt through which the hot gas flows for heating the sheet provided thereon, causing a difference in temperature between the front and back sides of the sheet. Moreover, such a reinforcement brings about variation in temperature and in cross-linking rate on the backside of the sheet because the position of the sheet relative to the reinforcement is kept unchanged throughout the passage of the sheet on the conveyor belt.

The present invention has been made with a consideration of the above problems of the conventional technique.

In accordance with the present invention there is provided an apparatus for thermally treating a sheet of a cross-linkable and foamable polyolefin resin, comprising:
a furnace;
a pair of parallel endless roller chains having an endless conveyor belt which is formed of a plain weave wire net and which is disposed between and connected to said pair of endless roller chains for movement therewith, each of said endless roller chains being in mesh with a drive sprocket and one or more idler sprockets spaced therefrom so that there is defined within said furnace a substantially flat path between said pair of endless roller chains along which said conveyor belt can run while supporting the sheet thereon;
a plurality of parallel, spaced apart rolls each oriented in a direction perpendicular to the direction in which said conveyor belt runs along said path and disposed adjacent to said path for supporting engagement and rolling contact with said conveyor belt running along said path; and
first heating means provided in said furnace for heating the sheet fed onto said conveyor belt running along said path so that the sheet on said conveyor belt may undergo cross-linking during its passage through said path.

In another aspect, the present invention provides a method of cross-linking a sheet of cross-linkable and foamable polyolefin resin, comprising:
introducing the sheet into a furnace comprising an endless conveyor belt travelling along a predetermined path including a substantially flat path and formed of a plain weave wire net having a mesh size of between 20 and 70 mesh and a substantially uniform thickness;
feeding the sheet onto said endless belt travelling along said flat path to allow said sheet to travel therewith; and
heating said sheet travelling along said flat path at a temperature so that said sheet may undergo cross-linking.

The present invention will be described in detail below with reference to the accompanying drawings in which.

Figure 1:
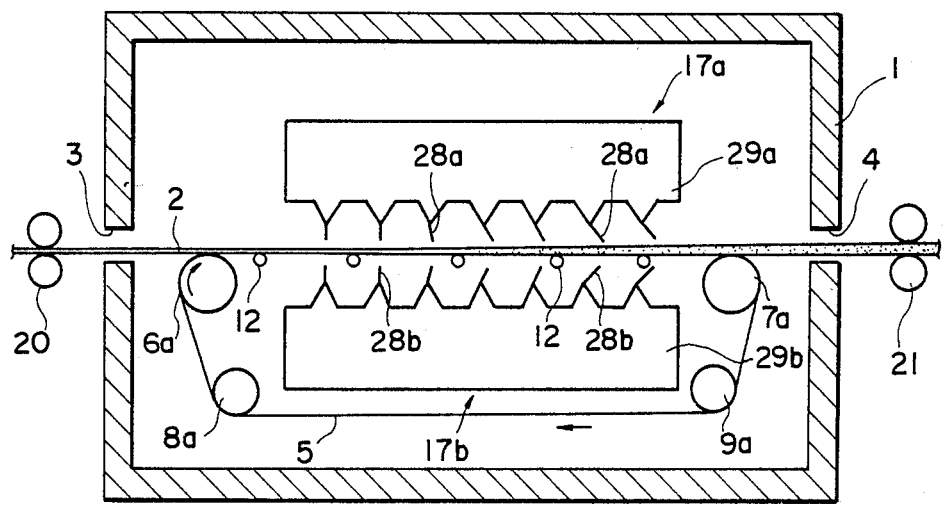
FIG. 1 is a vertical, cross-sectional view diagrammatically showing one embodiment of thermal treatment apparatus according to the present invention.
Figure 2:
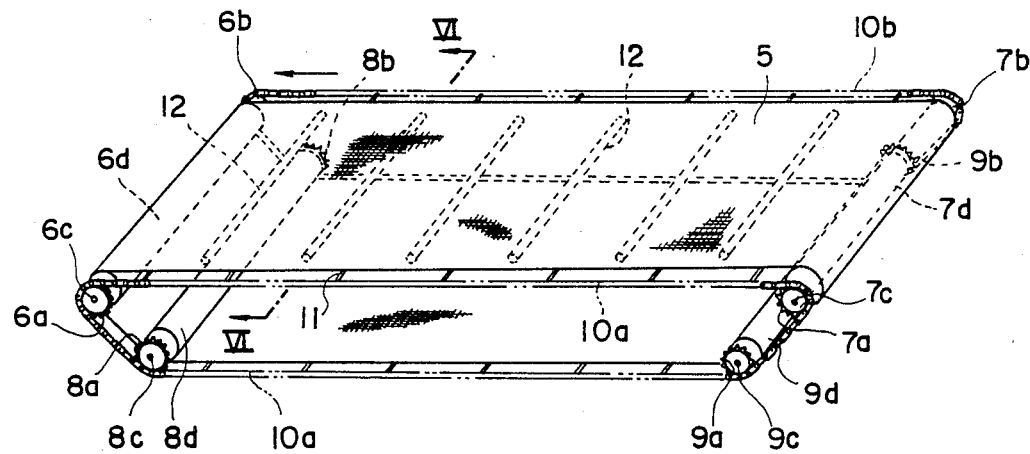
FIG. 2 is a perspective view schematically showing the belt conveyor of the apparatus shown in FIG. 1.
Figure 4:
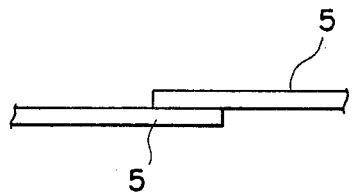
Figure 5:
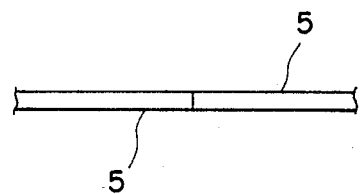
Figure 6:
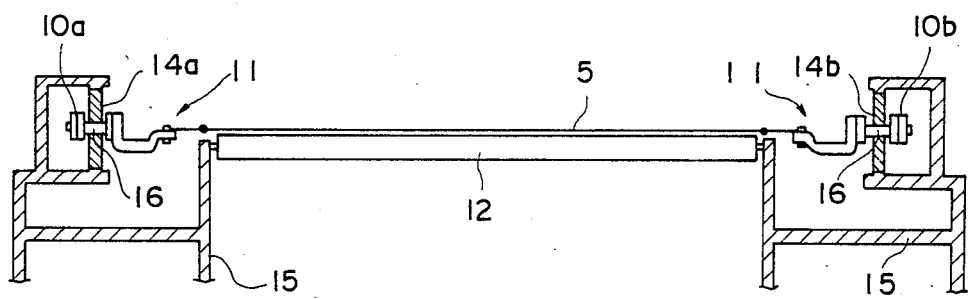
Figure 7:
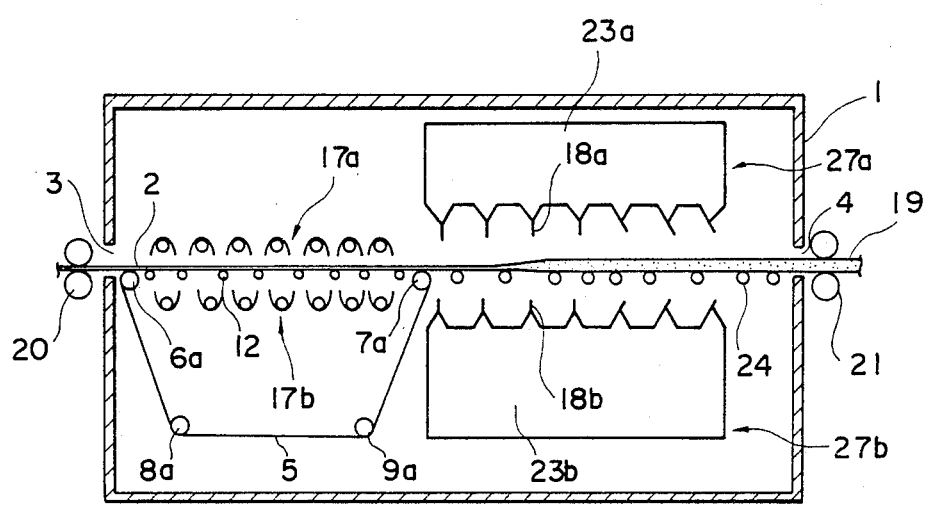
Figure 8:
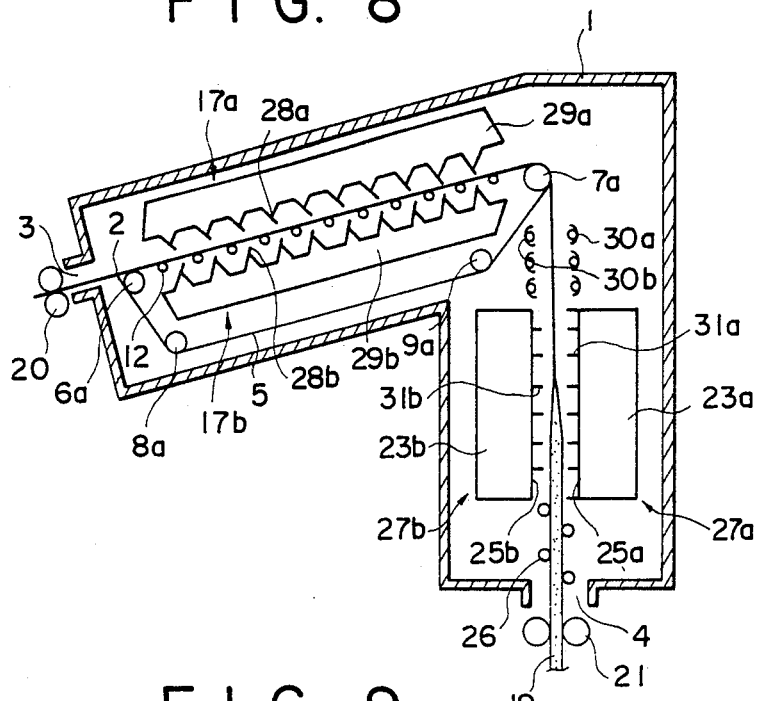
Figure 9:
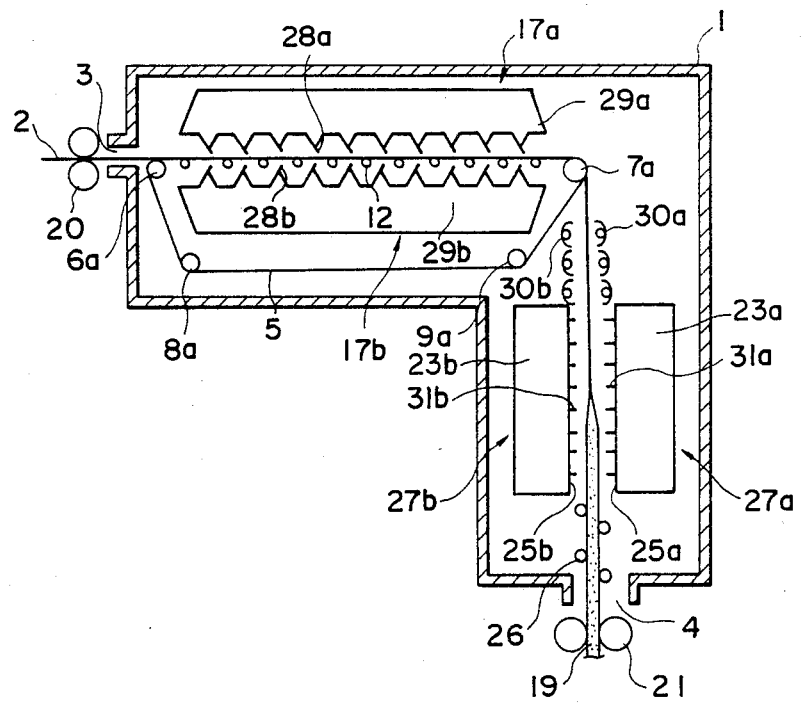

FIGS. 3(a) through 3(g) are plan views showing various weaves of wires, FIG. 3(a) being plain weave suitable for the present invention;

FIG. 4 is a side view schematically showing the joint portion of a conventional endless wire belt;

FIG. 5 is a side view, similar to FIG. 4, showing the joint portion of the endless conveyor belt according to the present invention;

FIG. 6 is a fragmentary, cross-sectional view taken along line VI—VI in FIG. 2;

FIG. 7 is a vertical cross-sectional view, similar to FIG. 1, showing another embodiment according to the present invention; and FIGS. 8 and 9 are vertical cross-sectional views, similar to FIG. 7, showing further embodiments of the present invention.

Referring now to FIG. 1, the reference numeral 1 denotes a furnace within which a sheet 2 of a cross-linkable, foamable polyolefin resin introduced thereinto through an inlet 3 by any suitable means, such as a pair of feed rolls 20, is thermally treated for effecting cross-linking and, if desired, foaming of the sheet. The heat-treated sheet is discharged through an outlet 4 from the furnace 1 with the aid of any suitable means such as a pair of discharge rolls 21.

Disposed within the furnace 1 is an endless conveyor belt 5 for supporting the sheet 2 thereon and for conveying same through the furnace 1. Details of the conveyor belt arrangement is shown in FIG. 2, in which designated as 6c, 7c, 8c and 9c are four parallel shafts which are journalled on a base frame (not shown) and to which are fixedly secured pairs of sprockets 6a and 6b, 7a and 7b, 8a and 8b and 9a and 9b, respectively. The shaft 6c is operatively connected to a drive shaft of a drive motor (not shown) so that the sprockets 6a and 6b function as drive sprockets while the other sprockets serve as idler sprockets. A pair of endless roller chains 10a and 10b are in mesh with the sprockets 6a, 7a, 8a and 9a and 6b, 7b, 8b and 9b, respectively, and are positioned in parallel with each other.

The endless conveyor belt 5 is wound around four rollers 6d, 7d, 8d and 9d coaxially supported on the shafts 6c, 7c, 8c and 9c, respectively, and disposed between the pair of endless roller chains 10a and 10b with its both side edges being connected by a plurality of links 11 to the opposite chains 10a and 10b. As a consequence of the above structure, when the pair of roller chains 10a and 10b are moved in the direction shown by the arrow A upon driving the drive sprockets 6a and 6b, the conveyor belt 5 connected thereto moves simultaneously in the same direction along a predetermined path of travel. The sprockets 6a–9a and 6b–9b are so arranged that there is formed a straight, flat path along which the conveyor belt 5 can run while supporting the sheet thereon.

The endless conveyor belt 5 is preferably formed of an elongated, plain weave wire net having such a weave as shown in FIG. 3(a). Both ends of the wire net are abutted against and bonded with each other as shown in FIG. 5 to provide the endless structure. The twilled weave net as shown in FIG. 3(b) is inferior to the plain weave net with respect to the releasability of the cross-linked sheet from the net. Plain Dutch weave (FIG. 3(c)), twilled Dutch weave (FIG. 3(d)) and stranded twill weave (FIG. 3(e)) are ill-suited for the purpose of the present invention because of their low voidage which in turn results in both the unevenness of heating of the sheet placed thereon and the adhesion of the sheet thereto. Balance weave (FIG. 3(f)) and Herringbone weave (FIG. 3(g)) are also ill-suited because of their roughness of the surfaces which causes intrusion of the sheet into the wire net, resulting in the reduction of releasability of the sheet from the net and the formation of impression of the net on the surfaces of the product.

It is preferred that the mesh size of the plain weave wire net be between 20 and 70 mesh (between 0.84 and 0.21 mm), more preferably between 30 and 60 mesh (between 0.59 and 0.25 mm). With a wire net having a mesh size of coarser than 20 mesh, the sheet tends to intrude in the openings of the net. A mesh size of the net of finer than 70 mesh tends to cause the adhesion of the sheet to the net because of the increase in the contact area between them.

As described previously, the endless belt 5 is formed by abutting both ends of an elongated wire net against each other as shown in FIG. 5. Such an abutting engagement is preferable as compared with an overlapping structure as shown in FIG. 4, because, in the latter structure, the surface becomes irregular and the thickness becomes larger at the joining portion. The abutting joint may be effected by any suitable way such as soldering or sewing with a very fine wire.

Referring again to FIG. 2, a plurality of spaced apart parallel rolls 12 are rotatably supported to a base frame 15 (FIG. 6) and arranged adjacent to the straight path for supporting engagement and rolling contact with the conveyor belt 5. The rolls 12 serve to improve the flatness of the path along which the conveyor belt 5 travels while supporting the sheet to be treated thereon. Moreover, unlike a reinforcement provided over the back surface of a wire net for movement therewith, the rolls 12 do not adversely affect the uniformity in heating the sheet placed on the conveyor belt 5. The distance between two adjacent net support rolls 12 is preferably 100–500 mm.

As shown in FIG. 6, in order to prevent lateral winding of the path of travel of the conveyor belt 5, the pair of endless roller chains 10a and 10b are preferably guided by a pair of parallel guide members 14a and 14b extending along the opposite sides of the path, respectively, and mounted on C-shaped portions of the base frame 15. More specifically, each link 11 has a guided neck portion 16 which is inserted through an elongated aperture formed in the guide member 14a (or 14b). As a result, both the vertical and lateral movements of the pair of roller chains 10a and 10b are restricted and the flatness and straightness of the path along which the conveyor belt runs are maintained.

Referring again to FIG. 1, heating means 17a and 17b are provided above and beneath the straight path of the belt 5. In the illustrated embodiment, the heating means 17a and 17b include ducts 29a and 29b, respectively, having a plurality of transversely extending slits 28a and 28b, respectively, from which a hot gas is injected towards the path to heat the sheet 2 placed on the belt 5 so that the sheet 5 can undergo cross-linking during its passage through the path. By increasing the length of the straight path and the heating zone while controlling the retention time and temperature, it is possible to effect foaming of the cross-linked sheet within the same furnace, as illustrated in FIG. 1. The foamed product 19 is discharged from the furnace 1 through the outlet 4 for recovery.

FIG. 7 shows another embodiment of the present invention in which like reference numerals indicate the same component parts. The apparatus illustrated in FIG. 7 has first heating means 17a and 17b each comprised of infrared heaters and defining therebetween a first heating zone through which the conveyor belt 5 travels while supporting the sheet 2 thereon. Disposed adjacent to and downstream of the first heating means 17a and 17b are second heating means 27a and 27b including ducts 23a and 23b and slits or nozzles 18a and 18b, respectively, from which a hot has such as hot air is blown and defining a second heating zone therebetween. A plurality of parallel support rolls 24 are arranged in the second heating zone for supporting thereon the sheet supplied from the first heating zone. The first heating zone is arranged to heat the sheet to a first temperature sufficient to cross-link the sheet, while in the second heating zone the cross-linked sheet is heated to a second temperature higher than the first temperature so that the sheet may foam and expand.

In heat-treating the cross-linked sheet in the second heating zone, it is preferred that the hot gas injected from the nozzles 18b of the lower heating means 27b have a greater wind pressure than that from the nozzles 18a of the upper heating means 27a so that the cross-linked sheet travelling on the rolls 24 may float thereon. Because the sheet expands upon foaming in three-dimensional directions, the rate at which the foamed sheet 19 is discharged from the furnace must be controlled to an appropriate rate greater than that at which the cross-linkable, foamable sheet 2 is fed to the furnace. If the take-up rate is lower than the appropriate rate, the sheet in the furnace will wave to cause the formation of wrinkles in the product. On the other hand, a take-up speed higher than the appropriate rate causes stretching of the sheet, resulting in the reduction in size of the foamed product. However, since there may be a fluctuation in the expansion rate of the sheet, it is very difficult, in practice, to control the take-up rate. The floating of the sheet on the rolls 24 as mentioned above can compensate such a fluctuation to a certain degree and is preferable for reason of easy control of the take-up speed.

FIG. 8 illustrates an alternate embodiment, in which like reference numerals designate like component parts. The furnace 1 of this embodiment is constituted from a slanted portion in which the sheet 2 is subjected to a cross-linking condition by means of first heating means 17a and 17b and a vertical portion in which the cross-linked sheet is subjected to a foaming condition by means of second heating means 27a and 27b. The cross-linked sheet is released from the conveyor belt 5 at the end of the straight path, i.e. at the roller 7d (FIG. 2) coaxially aligned with the rotational axis of the idler sprocket 7a. The cross-linked sheet is then displaced vertically downward and is passed between the second heating means 27a and 27b and undergoes foaming. The foamed product is continuously discharged from the furnace 1 by means of the discharge rolls 21. The second heating means 27a and 27b in this embodiment include air ducts 23a and 23b, respectively, having perforated or porous plates 25a and 25b, respectively, from which a hot gas is blown on the both-surfaces of the vertically running, cross-linked sheet to cause expansion thereof. The reference numerals 31a and 31b designate baffles mounted on the perforated plates 25a and 25b, respectively, for controlling the direction of the hot gas flow. Designated as 30a and 30b are auxiliary heaters optionally provided between the first and second heating means and as 26 a plurality of guide rolls for preventing the swelling wave (perpendicular movement) of the sheet. By streaming a cooled fluid within the guide rolls 26, the foamed sheet 19 can be cooled during its passage through the guide rolls 26. The path along which the conveyor belt 5 runs while supporting the sheet 2 thereon may be upgrade (as shown in FIG. 8), horizontal (as shown in FIG. 9) or downgrade (not shown) and preferably has an inclination of between −30° and +30°.

According to the embodiment shown in FIG. 8, both sides of the sheet can be heated to substantially the same temperature because of the absence of any intervening materials, such as rolls 24 of the embodiment in FIG. 7, between the heat source and the sheet. Further, without specific control of the wind pressure of the hot gas from the perforated plates 25a and 25b, the take-up of the foamed sheet 19 can be performed easily and smoothly.

FIG. 9 depicts an alternate embodiment of the apparatus shown in FIG. 8, the only difference therebetween being that the sheet 2 to be treated is maintained in substantially horizontal position in the first heating zone of the apparatus of FIG. 9. In heat-treating the cross-linkable, foamable sheet in the apparatuses of FIGS. 8 and 9 in which the cross-linked sheet is maintained in vertical position during the foaming and expanding step, it is preferred that the cross-linking be conducted to provide a cross-linking degree (in terms of gel fraction) at a stage just after the departure of the sheet from the conveyor belt of at least 30%, more preferably 40–70%.

Various kinds of polyolefin resins may be used for the purpose of the present invention. Examples of such polyolefin resins include homopolymers and copolymers of olefins such as ethylene, propylene and butene; copolymers and terpolymers of olefins and other polymerizable monomers such as vinyl acetate and acrylic acid; and mixtures of the above polymers with other polymers such as styrene-butadiene rubbers, acrylonitrile-butadiene-styrene resins, chlorinated polyethylenes and chlorosulfonated polyethylenes. It is preferred that the polyolefin resins have a melt index (MC) of not greater than 2.0 g per 10 min, more preferably not greater than 1.5 g per 10 min for reasons of freeness of intrusion of the resin into the openings of the wire net.

The polyolefin resin is mixed with a conventional blowing agent and a conventional cross-linking agent in amounts suitable for providing a cross-linkable and foamable polyolefin resin. Illustrative of suitable cross-linking agents are organic peroxides such as dicumyl peroxide, 2,5-dimethyl-2,5-di(tert-butylperoxy)hexane and tert-butylhydroperoxide; azides; vinyl-group-containing silane compounds; and silanol condensation catalysts. Blowing agents may be compounds of a type which is decomposable at an elevated temperature to generate a gas and include, for example, p,p'-oxybisbenzenesulfonylhydrazide, azodicarbonamide, N,N'-dinitrosopentamethylenetetramine and azobisisobutyronitrile. The cross-linkable, foamable polyolefin resin may further contain various other additives such as a foaming assistant, a cross-linking assistant, an antioxidant, a pigment, an antistatic agent and a flame retardant.

In order to improve the releasability of the heat-treated sheet from the wire net conveyor belt, it is advantageous to apply a coating composition containing a releasing agent over the surface of the sheet to be treated which contacts with the belt in an amount of 0.02–1, preferably 0.05–0.5 g per one square meter of the sheet in terms of a dry weight. Suitable releasing agents are silicone resins such as silicone oil and fluorine resins such as polytetrafluoroethylene, polychlorotrifluoroethylene, tetrafluoroethylene-hexafluoropropylene copolymers and polyfluoroinated vinylidenes.

The coating composition may be in the form of a solution, emulsion, suspension, dispersion, paste or the like in a suitable medium such as water, an organic solvent or a mixture thereof. Above all, the use of an aqueous dispersion or emulsion is preferred for reasons of economy and easiness in handling. The content of the releasing agent in the coating composition is preferably 0.2–10 wt %, more preferably 0.5–5 wt %. The coating composition may contain an additive, especially a surfactant such as a fatty acid ester of sucrose. The coating composition can be applied to the sheet to be treated by any known coating method such as brush coating, spray coating, roll coating, wire bar coating and dip coating.

The following examples will further illustrate the present invention.

EXAMPLE 1

A mixture containing 100 parts by weight of a low density polyethylene having a melt index of 1.4 g per 10 min, 17 parts by weight of azodicarbonamide and 0.8 parts by weight of dicumyl peroxide was extruded to form a cross-linkable and foamable sheet having a width of 420 mm and a thickness of 1.8 mm. The sheet was heat-treated in an apparatus as shown in FIG. 8. The conveyor belt was formed of a plain weave wire net having a mesh size of 45 mesh (0.35 mm) and abutted at its opposite ends to form an endless structure. A plurality of rolls were arranged at an interval of about 400 mm for supporting the conveyor belt and for maintaining a flat, straight path. The running speed of the belt was 1 m/min. The cross-linking was performed on the conveyor belt travelling along the path with hot air having a temperature of about 180° C. The cross-linked sheet was removed from the belt conveyor and was further heat-treated with hot air having a maximum temperature of 245° C. to obtain a foamed sheet having a thickness of 5.0 mm, a width of 1200 mm and a density of 0.034 g/cm$^3$. The cross-linked sheet was able to be easily separated from the conveyor belt and smoothly fed to the foaming zone. Both the upper and lower surfaces of the foamed sheet were very flat and the lower surface had no impression of the wire net pattern.

EXAMPLE 2

Example 1 was repeated in the same manner as described except that various conveyor belts with different mesh sizes or different weave were used in lieu of the 45 mesh plain weave wire net. The releasability of the cross-linked sheet from the belt, formation of the wire net marks on the foamed sheet and the flatness of the surface of the foamed sheet were examined, the results of which are summarized in Table below.

| Experiment No. | Weave pattern | Mesh size | Releasability | Formation of wire net mark | Flatness |
|---|---|---|---|---|---|
| 1 | Plain | 18 | poor | remarkable | bad |
| 2 | Plain | 45 | good | none | good |
| 3 | Plain | 75 | poor | none | bad |
| 4 | Twilled | 50 | poor | Slight | bad |
| 5 | Plain Dutch | 10 × 60 | very bad | none | bad |
| 6 | Twilled Dutch | 10 × 200 | very bad | none | very bad |
| 7 | Stranded Twill | 30 × 40 | very bad | none | very bad |
| 8 | Balance | — | poor | remarkable | very bad |
| 9 | Herringbone | — | Poor | remarkable | very bad |

EXAMPLE 3

Example 1 was repeated in the same manner as described except that the extrudate sheet was, before being fed to the heat treating apparatus, dipped in an aqueous releasing composition prepared as follows:

Silicone resin coating composition: A commercially available silicone emulsion (TORAY SILICONE SH7024) was diluted with water to a silicone content of 2 wt %, with which was mixed a fatty acid ester of sucrose.

Fluorine resin coating composition: A commercially available aqueous polytetrafluoroethylene dispersion (TEFLON 30J) was diluted with water to a polytetrafluoroethylene content of 3 wt %, with which was mixed a fatty acid ester of sucrose.

The releasability of the cross-linked sheet from the endless conveyor belt was found to be improved in both cases.

We claim:

1. An apparatus for thermally treating a sheet of a cross-linkable and foamable polyolefin resin, comprising:

a furnace;

a conveyor assembly providing a substantially flat path along which the sheet is supported and conveyed through the furnace, said assembly including:

a pair of parallel-disposed endless roller chains having an endless conveyor belt formed of a plain weave wire net disposed between and connected to said chains by a plurality of rigid links for movement therewith, each of said chains being in mesh with a drive sprocket and one or more idler sprockets spaced therefrom;

a plurality of parallel, spaced-apart rolls, each stationarily disposed and oriented perpendicularly to the direction of conveyor belt movement and positioned for supporting engagement and rolling contact with said conveyor belt;

an elongated guide means provided adjacent to each side of said conveyor belt and engageable by said links and cooperating therewith for preventing both vertical and lateral movement of the links and conveyor belt; and a heating means provided in said furnace for heating the sheet moved on said conveyor belt so that said sheet may undergo cross-linking during its movement through the furnace by said conveyor assembly.

2. An apparatus as claimed in claim 1, wherein each of said guide means is provided with an elongated slot extending along the length thereof and each of said links having a portion engaged within said slot and coacting therewith to prevent vertical and lateral movement of said link and conveyor belt.

3. An apparatus as claimed in claim 1, wherein said wire net has a mesh size of between 20 and 70 mesh.

4. An apparatus as claimed in claim 1, wherein said endless conveyor belt is formed from an elongated sheet of the wire net with its opposite ends being abuttingly joined to each other so that said endless conveyor belt has substantially uniform thickness over its length and breadth.

5. An apparatus as claimed in claim 1, further comprising second heating means, provided in said furnace and disposed downstream of said first heating means, for heating the cross-linked sheet to a temperature so that it may foam and expand.

* * * * *